Oct. 3, 1950 P. L. TOLBERT 2,524,551
OVERTIRE
Filed June 15, 1945 2 Sheets-Sheet 1
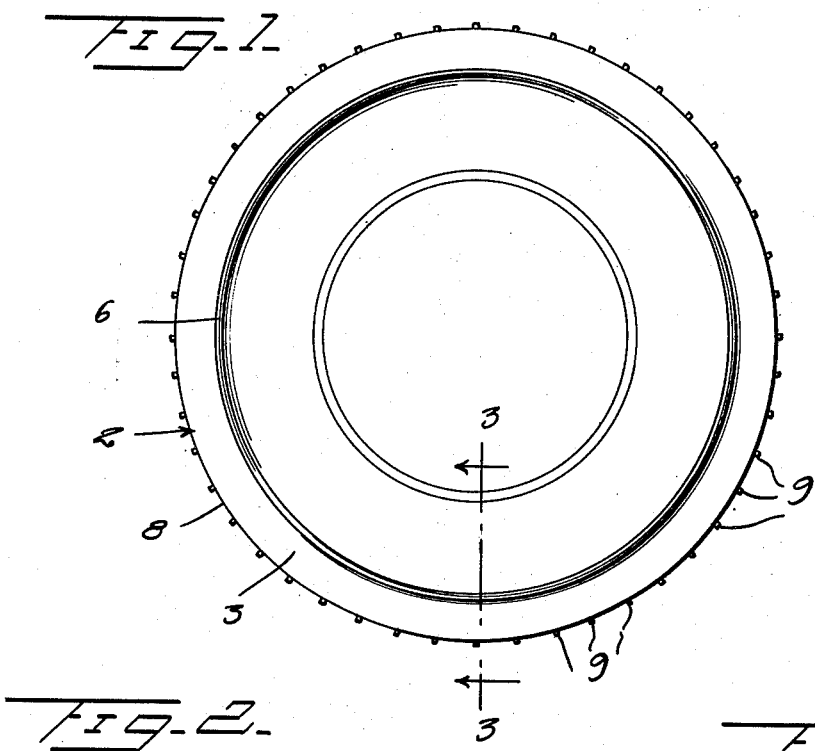
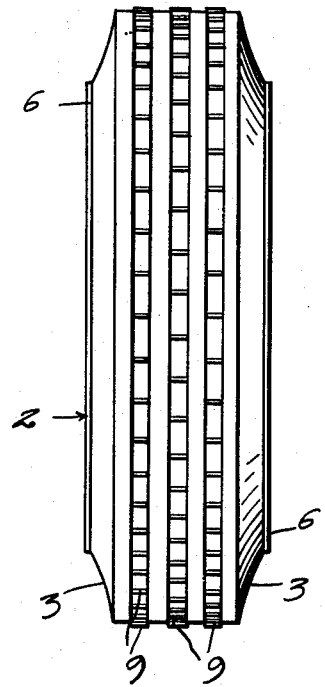
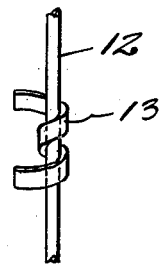
Inventor
P. L. Tolbert
By Randolph & Beavers
Attorneys Oct. 3, 1950            P. L. TOLBERT            2,524,551
OVERTIRE
Filed June 15, 1945                               2 Sheets-Sheet 2
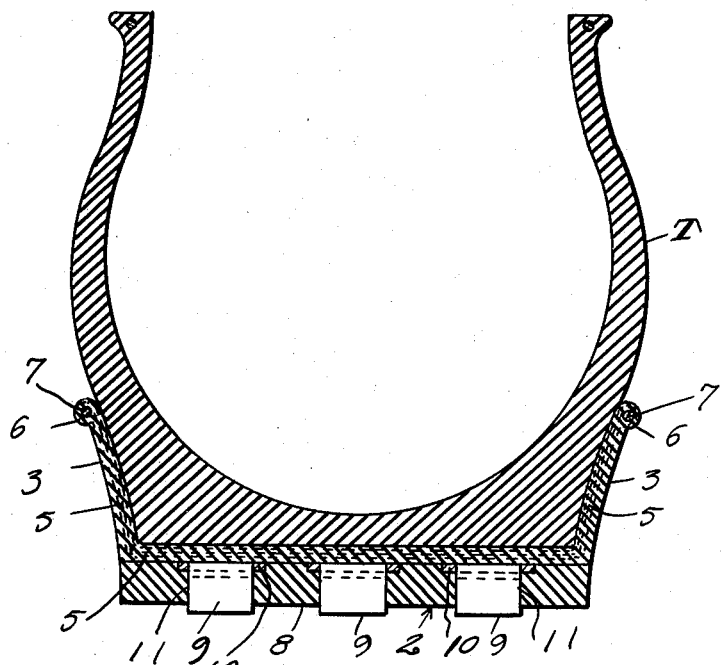
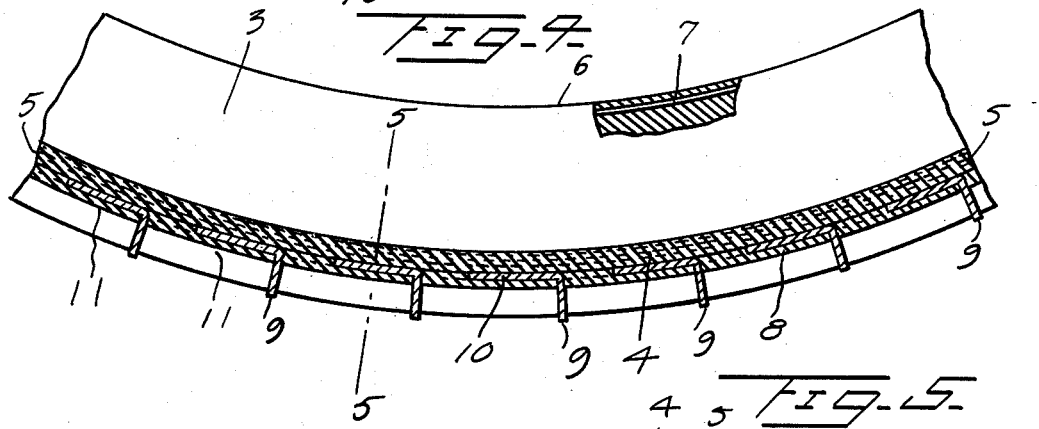
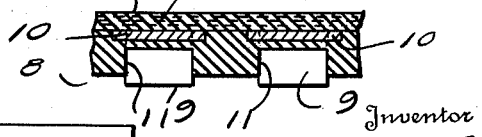
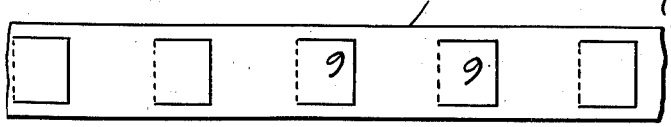
Inventor
P. L. Tolbert
By Randolph & Beavers
Attorneys Patented Oct. 3, 1950

2,524,551

UNITED STATES PATENT OFFICE 2,524,551

OVERTIRE

Philip L. Tolbert, Indianapolis, Ind.

Application June 15, 1945, Serial No. 599,697

4 Claims. (Cl. 152—175)

This present invention relates to an overtire for pneumatic or solid tires and has for a purpose the provision of efficient, inexpensive and simple means whereby the life of a tire may be lengthened.

Another object of the invention is the provision of an overtire that may be put on the tire after deflating the latter within a short time and by a person having little, if any skill and without smoothing or treating the tire or cementing it.

It is a further object of the invention to provide an overtire that may with ease be removed from a tire or be changed to another tire.

Another object of the invention is the provision of an overtire that can be used on tires unfit for recapping and will add strength to the same.

The invention resides in the construction, combination and arrangement of parts as fully set forth herein and particularly pointed out in the appended claims.

With these objects and other objects which will become apparent from the following disclosure, in view, the preferred embodiment of my invention will be fully described and illustrated in the drawings in which:

Figure 1 is a front view of a tire partially covered with the overtire;

Figure 2 is a side view of the latter;

Figure 3 is an enlarged transverse section through a tire and the overtire partially covering the same;

Figure 4 is a section at right angles to the axis of the overtire;

Figure 5 is a section on line 5—5 of Figure 4;

Figure 6 is a detail view of the band from which the lugs are punched laid out flat;

Figure 7 is a detail view of a modified form of lug structure.

In the drawings in which like reference characters designate like or similar parts, numeral 2 denotes generally the overtire constituting the embodiment of my invention. Figure 3 shows the overtire to have the general shape of a channel including a pair of walls 3 that diverge from one another inwardly or toward the axis of rotation of the wheel and extend only across a portion of the side of a tire. The channel walls and the web 4 connecting the outer edges of the walls are made from the same material and by substantially the same method that are used in making the tire T portions covered thereby and are reinforced by cords 5. The inner edge of each wall is formed into a bead 6 reinforced by a wire 7 or strong cord. From the outer surface of the tread 8 extend lugs 9. The latter are of rectangular shape and are produced by stamping out of a strip 10 the three sides of a rectangle and then bending the stamped out parts outwardly on one side. The length of the strip equals the outer circumference of the web. The strip with the lugs stamped out is bent into a circle having the lugs on the outer side and the ends are welded together. The ring is placed around the web portion of the overtire and molded to the latter in such a way that grooves 11 remain out of which the lugs extend (Figures 3, 4) beyond the ungrooved portions of the tread 8. The lugs thus disposed enhance the durability of the overtire and furnish the necessary traction.

Figure 7 shows a modified form of lugs. Parallel wires 12 are surrounded by coiled metal strips 13 and are embedded in the moulded portion, so that the strips extend beyond the outer surface.

Since the overtire will be made in only one size for each size of tire, it will probably be necessary to use a filler between a badly worn tire and the inner surface of an overtire. Such a filler could be made from low grade rubber or rubber reinforced by cords.

It will, of course, be understood that various changes may be made in the form, details, arrangement and proportions of the various parts without departure from the spirit or scope of the invention as defined in the appended claims.

What I claim and desire to secure by Letters Patent is:

1. An overtire for a pneumatic tire comprising a channel section including a reinforced web and side walls extending therefrom for covering the tread and outer side portions of the tire, a tread molded to the outer surface of the channel web and having a plurality of circumferential grooves, and a plurality of lugs embedded in the tread beneath said grooves and extending radially to beyond the outer surface of the tread and disposed transversely of the grooves.

2. An overtire for a pneumatic tire comprising a channel section including a reinforced web and sidewalls extending therefrom for covering the tread and outer side portions of the tire, a tread molded to the outer surface of the channel web and having a plurality of circumferential grooves, and a plurality of integrally formed, longitudinally spaced lugs embedded in the tread beneath said grooves and extending radially to beyond the outer surface of the tread and disposed transversely of the grooves.

3. An overtire for a pneumatic tire comprising a channel section including a reinforced web and side walls extending therefrom for covering the tread and outer side portions of the tire, a tread molded to the outer surface of the channel web and having a plurality of circumferential grooves, and an equal plurality of lug rings, one for each groove, embedded in the tread between the outer surface of the web and the bottom of the groove and each ring having integral lugs extending transversely of the groove and projecting radially to beyond the outer surface of the tread, said lugs being of a width equal to that of the tread grooves for engaging the side walls thereof.

4. A pneumatic tire tread having a plurality of circumferential grooves extending therearound and opening outwardly thereof, and a plurality of lugs embedded in the tread beneath said grooves and projecting radially outwardly through the grooves to beyond the outer surface of said tread, said lugs being disposed transversely of the grooves and being each of a width to engage both side walls of the groove in which it is disposed.

PHILIP L. TOLBERT.

REFERENCES CITED

The following references are of record in the file of this patent:

UNITED STATES PATENTS

| Number | Name | Date |
|---|---|---|
| 1,054,980 | Morgan | Mar. 4, 1913 |
| 1,740,616 | Midgley | Dec. 24, 1929 |
| 2,190,142 | Ansel | Feb. 13, 1940 |
| 2,262,349 | Webster | Nov. 11, 1941 |

FOREIGN PATENTS

| Number | Country | Date |
|---|---|---|
| 469,658 | Great Britain | 1937 |
| 435,919 | France | 1912 |